United States Patent [19]

Hogan et al.

[11] Patent Number: 5,778,368
[45] Date of Patent: Jul. 7, 1998

[54] REAL-TIME EMBEDDED SOFTWARE RESPOSITORY WITH ATTRIBUTE SEARCHING APPARATUS AND METHOD

[75] Inventors: Keith Hogan, Olney; Thomas H. Scholl; William E. Witowsky, both of Gaithersburg, all of Md.

[73] Assignee: Telogy Networks, Inc., Germantown, Md.

[21] Appl. No.: 642,060

[22] Filed: May 3, 1996

[51] Int. Cl.⁶ .................................................. G06F 15/76
[52] U.S. Cl. ........................... 707/10; 707/1; 707/9; 707/10; 395/187.01; 395/200.33; 395/200.47; 395/200.55
[58] Field of Search .................... 707/9, 10, 4, 104; 395/200.33, 200.47, 200.55, 187.01

[56] References Cited

U.S. PATENT DOCUMENTS

| | | | |
|---|---|---|---|
| 4,805,134 | 2/1989 | Calo et al. | 364/900 |
| 5,022,028 | 6/1991 | Edmonds et al. | 371/25.1 |
| 5,257,369 | 10/1993 | Skeen et al. | 395/650 |
| 5,313,614 | 5/1994 | Goettelmann et al. | 395/500 |
| 5,377,259 | 12/1994 | Butler et al. | 379/93 |
| 5,421,009 | 5/1995 | Platt | 395/600 |
| 5,446,842 | 8/1995 | Schaeffer et al. | 395/200.01 |
| 5,457,305 | 10/1995 | Akel et al. | 235/379 |
| 5,483,652 | 1/1996 | Sudama et al. | 395/600 |
| 5,546,455 | 8/1996 | Joyce et al. | 379/265 |
| 5,553,282 | 9/1996 | Parrish et al. | 707/10 |
| 5,596,632 | 1/1997 | Curtis et al. | 379/189 |
| 5,640,446 | 6/1997 | Everett et al. | 379/115 |
| 5,659,735 | 8/1997 | Parrish et al. | 707/10 |

*Primary Examiner*—Thomas G. Black
*Assistant Examiner*—Jean R. Homere
*Attorney, Agent, or Firm*—Roberts & Brownell, LLC

[57] ABSTRACT

The Real-Time Embedded Software Repository Apparatus fully characterizes, evaluates, and reuses real-time embedded software that is placed or stored in a repository database. The Repository System comprises at least one Repository Client and at least one Repository Server and utilizes simulation and translational techniques to allow Real Time Embedded Software (RTES) to be re-used, played, and evaluated on various desktop development environments or target operating environments. The Repository System organizes and processes Repository files as Repository Units which may comprise Software Source Files and Test Software. Repository Units also contain Attachments that provide current and historic information to static files that are stored in the Repository. The Repository Units are further characterized using analysis tools (software analysis) which allow the user to associate fixed and user defined Attributes to the RTES. A real-time embedded component (Component) provides a clear and well defined software interface to function at a high level of interaction with the RTES. Templates for both searching and displaying information in a multimedia format are also provided.

42 Claims, 12 Drawing Sheets

REAL-TIME EMBEDDED SOFTWARE RESPOSITORY WITH ATTRIBUTE SEARCHING APPARATUS AND METHOD

FIELD OF THE INVENTION

The present invention relates generally to a Multi-Cross Platform Repository System for real-time embedded software, and more particularly, the present invention provides the means to fully characterize, evaluate, and reuse real-time embedded software that is placed or stored in a repository database.

BACKGROUND AND DESCRIPTION OF THE RELATED ART

Real-time embedded software (RTES) is software that executes on customer hardware boards that are found within end-user products such as cellular phones, ATM switches, and anti-lock brake systems. This software typically operates custom displays, user interfaces, communication interfaces, and motors. By nature, RTES is not visible to the end user because it is completely contained within the product. Such software is also generally not visible to the company that developed it. This lack of visibility results in part from the fact that it operates through external interfaces and in part from the absence of products that permit and enhance both the visibility and reusability of RTES.

Lack of RTES visibility leads to wastes in staff utilization as well as decreased software quality because:

NIH (Not invented here) Syndrome is reinforced when an engineer cannot demonstrate that an existing piece of software works and conforms to certain quality standards Engineers routinely in part "re-invent the wheel" on small and medium size software modules because software that they design and code is bound to the project software and cannot be easily reused Software components from third party vendors or development partners cannot be easily reused because there are no defined mechanisms for demonstrating the operability and quality of software that they deliver Lack of visibility of RTES also negatively impacts the management aspects of a development organization. For example, because of lack of visibility:

Projects cannot be scheduled based on software re-use

Management doesn't know exactly what software exists in-house

In-house software assets that are known and located cannot easily be evaluated for re-use Management cannot easily access lower cost labor pools in places like universities and foreign countries.

Management cannot directly move engineers and programmers between groups because of the difference in tools, methodologies, and quality standards.

Lack of visibility also negatively impacts the business aspects of the corporation that develops RTES:

Executives cannot identify corporate software assets except at a finished product level.

Tools do not exist to help in determining the value of corporate software assets.

No accounting control exists over corporate software assets. Software re-use cannot easily be identified, accounted for, or tracked.

Despite these various problems, Developers of Embedded software based products are being forced by the market demands to:

shorten development time scales increase complexity increase quality decrease power utilization increase performance decrease cost provide highly integrated solutions These factors are forcing developers to increase utilization of existing in-house software, pursue joint development activities with outside organizations that specialize in related technologies, and move the software development methodology to a higher level.

A current trend in software development methodologies is to allow a higher level of integration amongst corporate software portfolios. As such, joint development of software and software modules between companies is becoming more prevalent, and in many instances, is required for a company's products to retain their technical edge—especially when an average product lifespan is a mere 18 to 24 months.

The lack of visibility of RTES, however, makes such joint developments quite impractical. Software Engineers have difficulty displaying software capabilities other than those visible via the external interfaces of an existing product. For example, routines that implement algorithms cannot be demonstrated or displayed to a technology partner by only showing the external interfaces of the product.

Re-use of software of varying types has been the subject of several inventions. To this end classical repository technology provides a means for storing and recalling items from a global storage media such as a database. This technology, however, does not fully respond to the need of a user to fully characterize or fully evaluate RTES that may be stored in a database. This technology also does not typically provide information about RTES to departments within a company (e.g. accounting departments) to determine the value of corporate assets. For example U.S. Pat. No. 5,022,028 to Edmonds et al. discloses a system for providing non-intrusive recording and input transmissions for use by a software verification system, such as a system that aids in fault detection. This system facilitates the testing of certain types of target software and addresses the quality issues of software development. This system does not provide visibility at the desktop into the operability of RTES to any user other than the software developer at the time of testing and further does not address issues of concern to management as outlined above.

U.S. Pat. No. 5,446,842 to Schaeffer et al. discloses an object-oriented collaboration system using framework architecture to provide current access to a framework application by multiple users. The users can collaborate over the application and jointly produce a finished product using standard development frameworks. The applications commence in a consistent state and are maintained by distributing commands to each application as they are entered at a controlling system. This system does not provide for storing, characterizing, and demonstrating RTES from a set of distributed repositories. This system further does not permit visibility to software other than to the users during software development.

U.S. Pat. No. 5,421,009 to Platt discloses a method of remotely installing software directly from a central computer. This invention teaches software that is intended to be installed on a target computer. In essence, this invention discloses a method for remote installation of software over a computer network which allows a user to interactively select each remote computer system for software installation or to provide a file containing a list of all remote computers on the system. In this system the software is installed on the target computer, but it does not address real-time software development or the re-use of software.

U.S. Pat. No. 4,805,134 to Calo et al. discloses an electronic system for accessing graphical and textual information. This invention teaches an extended architecture to foster cooperation among a wide range of remotely located terminals and databases. This system is based on database technology and does not teach the re-use of RTES. This invention is further intended to support textual and graphical information; however, it does not address specific requirements of RTES—or support to the development process.

The development and execution of RTES on the desktop is incomplete unless it has the capability of simulating multiple processor target platform (i.e. the platform on which developed RTES is to run)configurations. The development environment is also incomplete unless it provides the ability for software engineers to test the software that would operate in such an environment from their own desktops. As such, a simulation technique is needed when the development software engineers are analyzing or downloading (from other systems) RTES. An example of such a technique is represented by U.S. Pat. No. 5,313,614 to Goettelman et al. which discloses software for direct conversion of programs between different hardware architecture computer systems. This is accomplished via "translation software" which essentially creates an image of the source computer (in this case a computer on which code is to be developed which is analogous to the "target platform" noted above)on the computer on which software for the target platform is to be developed. This virtual hardware environment is provided in the development computer to manage differences in the address space layouts between the development and target computers. The "translator software", similar to emulation software in many respects, takes, as its input, programs compiled from the source machine and decodes and maps each source machine instruction to one or more of the target machine instructions, which thereafter, replicates the functionality of each source machine instruction. The mapping and decoding is performed off line and the resulting software translation is saved. The translation can be executed as many times as the user wishes, rather than being recreated each time the application is to be executed on the target machine.

In view of the re-use problem noted, in conjunction with the existing art, a system for overcoming the shortcomings of existing software development strategies would include a repository system for the storage, retrieval, and re-use of RTES. Such a system would operate simultaneously on a variety of platforms and allow RTES development organizations to fully characterize their software modules, software sub-systems, and software systems in a way that facilitates software visibility and re-use. This would be accomplished by providing a system that allows an engineer to search database repositories that contain RTES components scattered throughout a community of multiple repositories. This system would also use a variety of access methods to access the repository database(s) and allow the software engineer to download the requested RTES components onto his desktop. Once the RTES components are downloaded, the software engineer would be able to assemble the appropriate components, edit them according to his specific software application design, and run the new combination as if it were on the target computer. The software engineer would then be capable of reusing the components modules received from the repository as many times as needed. This design would also enable the software engineer to develop a software application from start to finish without the dependency on target hardware and based on the maximum re-use of existing software assets.

SUMMARY OF THE INVENTION

It is therefore an object of the present invention to provide a Repository System to allow re-use of real-time embedded software.

It is a further object of the present invention to provide an entire architecture for a Repository System comprising distributed Repository Servers communicating with multiple Repository Clients simultaneously.

It is yet a further object of the present invention to provide a Repository Server that includes desktop computer based servers, security packages, search and display templates, FTP server software, Repository Server storage medium, and software analysis tools for analysis of real-time software.

It is still yet another object of the present invention to facilitate software characterization through the use of software attributes, wherein said attributes provide a description of real-time embedded software for future review, characterization, and demonstration of the real-time embedded software on the user's desktop.

It is still a further object of the present invention to provide a Repository Client comprising web browser software and Client Helper Applications and accompanying applications to access real-time embedded software on a distributed Repository System.

It is still yet a further object of the present invention to provide a Repository Client comprising simulated Operating and Developing Environments, and at least one simulated Applications Environments.

It is also a further object of the present invention to provide a stand-alone Repository Station for real-time embedded software comprising Repository web server and browser capabilities, and dynamic web pages.

It is another object of the present invention to provide a stand-alone Repository Station for real-time embedded software comprising Repository Unit Attributes, a Repository search engine, real-time software analysis tools, a Repository CD, and access software to allow software to be characterized, search by characteristics, and retrieval for possible re-use.

It is yet another object of the present invention to provide a Repository System comprising at least one user search template and at least one user display template which utilize Attributes to characterize and format Repository Units, thereby allowing the user to perform customized searches of repository software components and allow the user to display the results in a custom format.

It is still another object of the present invention to provide a Repository Unit structure for real-time embedded software objects comprising Repository Attributes and Attribute values, Unit Descriptor Files, and a Unit Source Package all of which facilitate software re-use.

It is also another object of the present invention to provide a dynamic Repository display that is self configuring based on the response from the Repository search.

It is yet an additional object of the present invention to provide a Repository Station and Repository Client for checking-in or checking-out Repository Units from the Repository database.

It is an additional object of the present invention to provide a Repository Station and Repository Client Helper Applications for checking-in or checking-out Repository Units from the Repository database.

It is still an additional object of the present invention to provide a Repository Client and Repository Station Helper Application that downloads and plays real-time embedded applications over an internetworked system such as the Internet.

It is also an additional object of the present invention to provide Repository Units that contain additional analysis information, such as real-time Operating System Call Return Checking and real-time Operating System Call Utilization.

It is an added object of the present invention to provide a Repository web page based administrative interface for configuring and administering the Repository Server and Repository Station.

It is still an added object of the present invention to provide a Repository administrative interface for configuring and administering the Repository Server and Repository Station.

It is also an added object of the present invention to provide an administrative package that updates browse and re-use counts as well as password and access lists, creates charges to account records, and updates system files such as, completing the check-in process for new Repository Units, as well as checking security logs and resolving security issues.

These and other objects and advantages of the present invention will be apparent to those persons skilled in the art upon examination of the detailed description of the invention, the drawing figures, and the appended claims.

The "Real-Time Embedded Software Repository Apparatus and Method" ("the present invention") is designed to facilitate the re-use and visibility of RTES. This capability is provided by allowing a multitude of different files or groups of files to be stored and utilized in describing, demonstrating, or providing support for the re-use of RTES which is stored along with such descriptive files. These files may be textual, graphic, audio, voice or any other file types which aid in describing the associated RTES. This allows the user to create a multimedia presentation of the RTES intended to be re-used, and may include live interactive demonstrations.

The Repository System of the present invention comprises at least one Repository Client and at least one Repository Server. In the present invention the Repository System provides the Repository Client with a means to fully characterize, retrieve, evaluate, and demonstrate, via fixed as well as user definable attributes, RTES which are placed or stored in a Repository database. The Repository Clients can be located anywhere in the internetwork, such as a Local Area Network (LAN), on distributed networked LANs, on distributed LANs across the Internet, on distributed Wide Area Networks (WAN), on distributed Metropolitan Area Networks (MAN), or any combination of the above—and may be any of a wide variety of desktop (PC, UNIX, MAC), minicomputer, or mainframe platforms.

The present invention also utilizes the simulation and translational techniques similar in function to that which is disclosed in Goettelmann et al. (as described above), and other known methods, to allow RTES to be re-used and to be played and evaluated on various desktop development environments or target operating environments, thereby allowing the developer to view operational aspects of the real-time applications. The system of the present invention supports real-time embedded software that utilizes real-time operating systems (RTOS) such as MXP, PSOS, VxWorks, or SPOX. The present invention thereby allows a software engineer to fully characterize a real-time embedded software module, software sub-system or software system in a manner that facilitates its re-use as well as achieves visibility of the software module. The software module, software sub-system or software system can provide added value to an entire organization.

The present invention provides platform independent access to the contents of the a Repository database, thus, permitting the user to utilize a desktop (MAC, PC, or a UNIX), minicomputer, or a mainframe machine to access reusable software components within the Repository databases.

The present invention also achieves high value added to the development process by providing both software and a wide variety of information about the software to users of varying levels of programming skills and management. The Repository System allows Repository Units to be annotated with Attributes that are applicable and meaningful to other organizations within a company, for example information such as cost, value, and related technology as well as attributes that technically relate to the RTES itself (i.e. lines of code, etc.). To this end, the present invention includes capabilities that are applicable to an entire range of users from marketing, to business development, to accounting, among others.

The Repository System organizes and processes Repository files as Repository Units which may comprise Software Source Files such as C, C++, Basic, and Fortran, and Test Software such as packet generation software, or device simulation code. Repository Units also contain Attachments that provide current and historic information to static files that are stored in the Repository. These Attachments may be voice files containing audio descriptions of the software, graphic data or any other data type that would help describe the RTES in question. The Repository Units are further characterized using analysis tools (software analysis) which allow the user to associate fixed and user defined Attributes to the RTES. The Repository Units are active entities which allow the addition of more attributes, E-mail threads, problem reporting threads, re-use counts, and test suites.

A real-time embedded component (Component) provides a clear and well defined software interface. The utilization of a component in the software allows the Repository System to function at a high level of interaction with the RTES. Such high level capabilities include playable RTES on the desktop as well as quality and code analysis.

A user at a Repository Client has the ability to build templates or utilize fixed templates for both searching and displaying information in a multimedia format about RTES stored in the Repository.

DETAILED DESCRIPTION OF THE INVENTION

Figure 1:
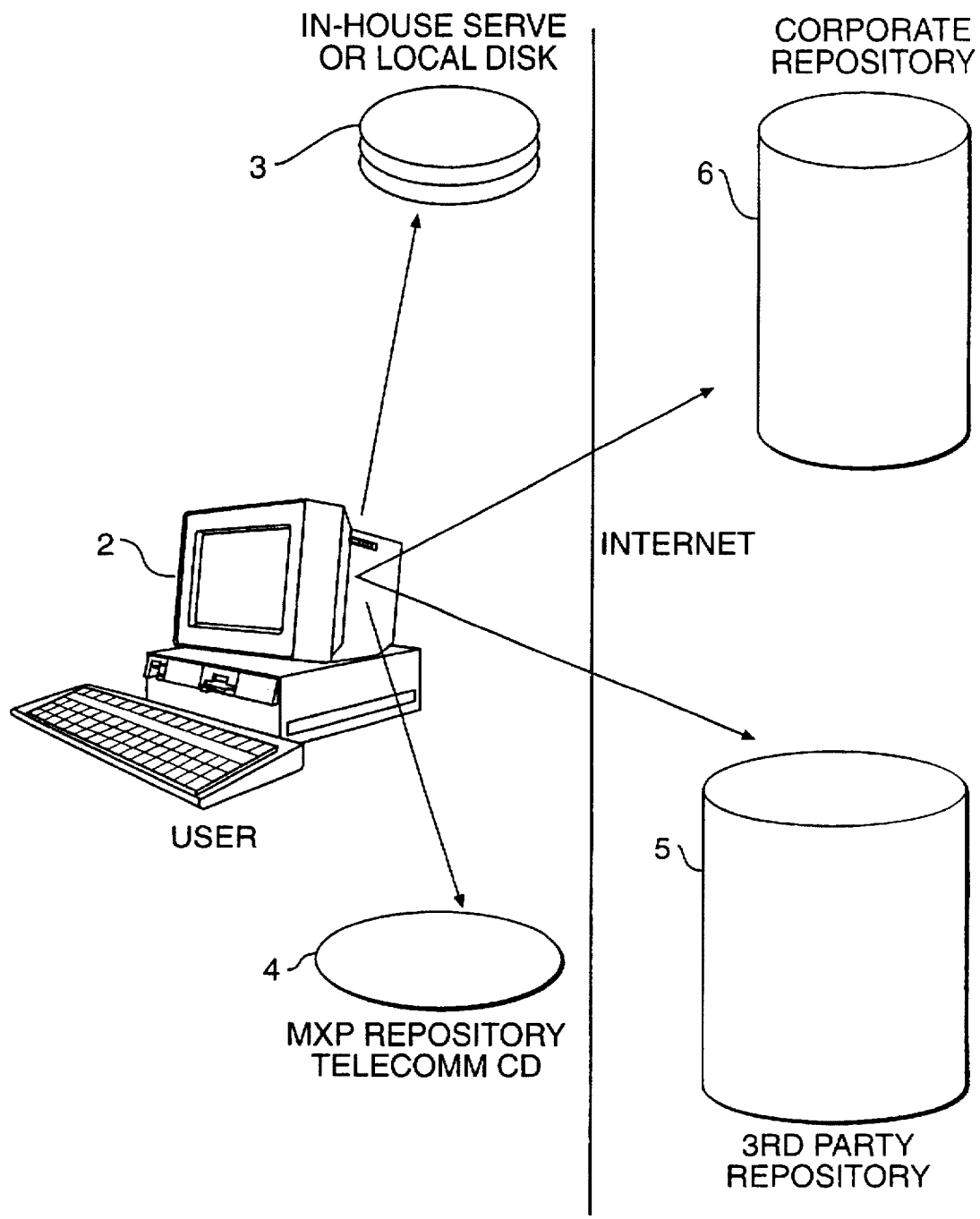
FIG. 1 Real-Time Embedded Software Repository System Architecture Overview.

For purposes of the description and claims relative to the system of the present invention, the following terms shall have the meanings set forth below.

Definitions

The following definitions are applied throughout this application.

CGI: Common Gateway Interface. This is the interface that is provided by web servers that connect to custom applications programs.

FTP: File Transfer Protocol. This is an application which is used to transfer files using the TCP/IP protocol.

HTTP: Hyper-Text Transfer Protocol. This is a protocol used by web servers to transfer web documents to clients.

HTML: Hypertext Markup Language. This is a standard language that the web browser interprets to create multimedia displays with entries that link to other documents.

RTES: Real-time embedded software. This is software that is intended to be executed on an embedded processor system.

Repository Unit: This is the smallest piece of information relating to embedded software stored in the MXP Repository. This component may be a Component, Framework, audio file, or a normal text or binary file or the real-time embedded software itself. A Repository Unit can also represent a collection of files with any combination of the above stated file types.

Attribute: This is a user assigned or system defined characteristic that is used to describe a Repository Unit. An Attribute can have a name, or include a value and a data type. A data type can include a name, format, value, validation, security access parameter, and other similar types.

Packager: This is Helper Application system that bundles Repository Units. The Packager runs on the Repository Client or Repository Station.

Un-packager: This is a Helper Application system that unbundles Repository Units. The Packager runs on the Repository Client or Repository Station.

Meta-data: This is data that is used to describe and characterize the contents of the Repository. For the MXP Repository, the Meta-data is referred to as the body of the Repository Unit Attributes.

CGI Program: This is a program that is launched by and runs on the web server to provide specialized processing and/or to create a dynamic HTML Document.

Real-Time Embedded Components: This is a real-time embedded software (RTES)unit that utilizes simulation techniques, thereby having the ability to run on a multitude of Operating Environments, to provide cross platform services, system extensions, and operating system functionality. The Components comprise test and analysis capabilities that allow the software engineer to fully characterize the functionality of the Component and is designed to the level analogous to an integrated circuit specification. The Components may be downloaded and executed on the desktop in a stand alone configuration or can be incorporated into an Application specific framework and then executed.

Application Frameworks: This is a software unit that utilizes the simulation techniques, thereby having the ability to run on a multitude of Operating Environments. This software unit, typically a Repository Unit, is in a semi-complete state requiring the addition of Components to affect a complete application. The Frameworks can be loaded to the desktop, and then the Components can be added to the Frameworks, at which time the completed Application can be executed on the Desktop.

Repository System: This is a system that comprises the Repository Client, Repository Server, Repository Station, and Repository database.

Repository Server: This is a computer with programs based on web server technology which contains a Repository file system that allows storing, searching, and retrieving of Repository Units.

Repository Client: This is a computer with programs based on web browser technology utilizing custom Repository programs which allows access to the Repository Servers.

Repository Station: This is a Repository System component that provides both client and partial server functionality. The Repository Station provides client functionality when accessing a Repository Server, and provides partial server functionality when functioning as a stand alone system accessing a local Repository CD or disk.

Repository System Overview

Referring to FIG. 1 a Repository System overview is shown. The complete Repository System provides the user 2 with the capability of re-using real-time embedded software (RTES)from a set of distributed Repositories 3, 4, 5 and 6. The user gains access to the Repositories via a networked system which includes PC's, MAC's, UNIX workstations, Windows NT, or other similar systems known in the field. These systems are known as Repository Clients or Repository Stations (if the Repository Client also comprises local CD Repositories). The accessed Repositories comprise in-house server or local disk Repositories 3, Repository technology-specific CD Repositories 4, third party Repositories 5 accessed via the Internet or other internetworked systems, or other internal off-site corporate Repositories 6 accessed via the Internet or other internetworked system. Stand-alone Repository Systems are also envisioned.

The Repositories 3, 4, 5, and 6 provide visibility into RTES stored in the Repository database, which, in turn, provide users with the ability to re-use real-time embedded Components (Components)or Application Frameworks (Frameworks) . The Component can be used as a basic building block to create software products that can be demonstrated and tested on the desktop. The Repository System further provides a high level of interactive value-added services to the user, thereby driving reusability of the Repository Units to high levels. Such value added services include code analysis, quality analysis, and the ability to provide "playable" RTES on the Repository Client or Repository Station. The Repository System further provides the necessary tools that allow software engineers to contribute objects to the Repository database for re-use by other software engineers.

Several Repository Clients and Repository Stations may access several Repositories simultaneously. In this context, several Repository Clients and Repository Stations may login to several off-site Repositories or local Repositories simultaneously to access, and thereafter display queried results in much the same concept as PC's MAC's, and UNIX workstations can all access Web servers on the Internet. The Repository Server then downloads the results on to the Repository Clients and Repository Stations and, after further instruction from the user, downloads or checks-out, i.e., unpackages, the requested Repository Units—via FTP or HTTP mechanisms—to the user's desktop. The Repository System further provides platform independent access to Components and Frameworks from a collection of distributed Repository Servers. If the Components and Frameworks are not compatible with the Client's desktop architecture—i.e., the software units were developed on a different operating platform—then simulation or translational techniques, wherein translation software creates a virtual hardware environment in the target computer that simulates the functionality of each source machine, is utilized.

The Repository System is based on a parent-child server hierarchy structure, though other Repository System structures such as Peer-to-Peer and Client-Server are envisioned. Generally, the Repository Client accesses a Repository Server which, in turn, searches for the Repository Units in the "accessed" Repository database that match the attribute criterion. If there are no matches found in the "accessed" Repository database, then the Repository Server searches other unrestricted repository databases until matching Repository Units are detected. The appropriate Repository Units are "tagged", browse counts on the Repository Server are incremented, and a list of these units are routed to the user's desktop in a dynamically generated Web Page(via the Station and Client Repositories) . The Attribute search results in matches for Repository Units that comprise components, Frameworks or other file types or collections of files. The user then selects certain Repository Units from the generated list and the Repository Server increments reuse counts and then downloads the Component to the user's desktop. The Repository System also downloads and provides information on Frameworks and other Repository Units. At this point the user may re-use the Repository Units or make any revisions thereto.

Access to Repository Units is achieved via searching based upon Attributes associated with the RTES stored in the Repository. A Repository Unit, Component, or Framework is described by one or more Attributes 23. By utilizing the defined Attributes 23 or designations, the user accesses the desired application for review, and for future modification or other uses. Thus, Attributes 23 provide the classification and structuring information for the Repository Units. It is envisioned that Attributes also track versions of Repository Units, Components, or Frameworks. This is accomplished by assigning a Version Attribute to an already existing Repository Unit. It is preferred that unless otherwise requested, an Attributes 23 search will always search for the latest versions of the requested Components—shielding the user from receiving duplicate information for a given Repository Unit. In alternate embodiments, Attributes may also comprise an Access List so as to limit access only users or user groups that appear on the Access List.

System defined Attributes 23 are described by name, format, value, and access parameters. These Attributes 23 are stored in a Repository Unit Descriptor File which includes the Attribute name and value, and are assigned by the Repository System at Repository Unit check-in. Additional Attributes 23 may be defined and assigned by the user, and further associated with a particular Repository Unit.

The Attributes 23 are utilized by the Repository Search Engine and by the user Search Templates to find Repository Units in the Repository. It is preferred that the Attributes 23 are defined with the following characteristics:

Attribute Name (character string 256 characters or less)
Attribute Format (string, integer, date, currency, etc.)
Attribute Value
Attribute Validation
Attribute Access Parameters The Attributes 23 include, but are not limited to, the following table of expressions:

| MXP | Software | Language | Creator | Size | Group |
|-----|----------|----------|---------|------|-------|
| Quality | Target | Creation Date | Project | Makefile | Cost |

Preferably, other System defined Attributes that are either required by the Repository System or are automatically assigned by the Repository Server include: Repository Unit Name; Repository Unit Creator; Revision Number; Original Repository Unit File Name; Repository Unit Type (e.g. Component, Framework, etc.); Repository Unit Password (if required); Repository Unit Text Description; Repository Unit Key Words; Parent Repository Unit List (this facilitates the hierarchical structure of Repository Units); Child Repository Unit list (this facilitates the hierarchical structure of Repository Units); and Peer Repository Unit List (this facilitates the relational structure of Repository Units).

In addition to Repository defined Attributes, the user or System Administrator also assigns Attributes 23 to aid in providing stronger application specific characterization of the Repository Units. Some examples of user or System Administrator assigned Attributes include: E-mail address of creator; mailing address of creator, development costs; list price of Repository Units; processor type; required MIPS; and required memory. It is important to recognize that the above Repository System defined and user or System Administrator assigned Attributes are not intended to be exhaustive listing, and as such, a person of ordinary skill in the present art will realize that other attributes are envisioned with the present invention.

A detailed description of the search and downloading of Repository Units based on Attribute searching follows.

Repository Server

A Repository Server is a multi-user server that provides access to reusable software to an internetworked user community. The Repository Server utilizes a commercial web server/browser product such as Netscapes or other software with similar properties to provide platform independent access to the Repository. Each Repository Server is independently searchable.

The Repository Servers further allow Repository Units to be searched, played, checked-in, checked-out, or purchased by a Repository user. Repository Clients and Repository Stations are supported by the Repository Servers. The Repository Servers support groups of Repository users who share common Repository facilities. A Repository Station has Client Repository capabilities and also supports a self-contained single user Repository not accessible to others.

Figure 2:
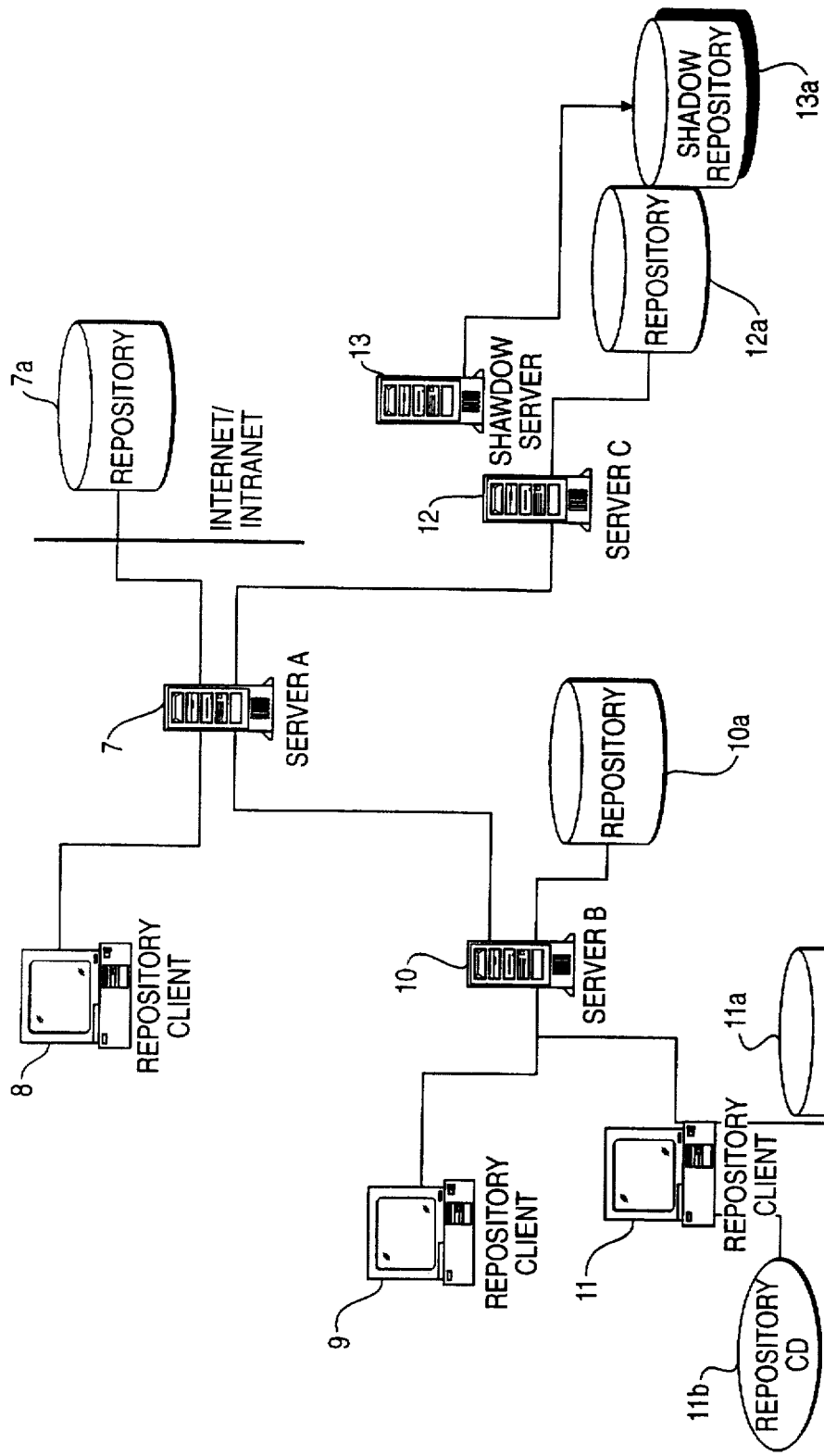
FIG. 2 Example of a Real-Time Embedded Software Repository System Architecture.

FIG. 2 illustrates a system level block diagram which represents a logical hierarchy of inter-networked Repositories, i.e., storage areas, which contain Repository Units that are valuable to developers of RTES. The Repository Servers 7, 10, and 12 are multi-user servers that provide access to reusable software to an internetworked user community. The Repository Servers 7, 10, and 12 are accessed by Repository Clients 8 and 9 and Repository Station 11. The Repository Clients 8 and 9 and Repository Station 11 access the appropriate Repository databases where the Repository Units meeting the requirements of a particular search reside. Several Repository Clients and Repository Stations can simultaneously access a number of different Repositories.

Thus, the Repository System supports multiple users, using Repository Clients simultaneously logged into multiple Repository Servers. The Repository Clients can be located anywhere in the internetwork, such as a Local Area Network (LAN), on distributed networked LANs, on distributed LANs across the Internet, on distributed Wide Area Networks (WAN), on distributed Metropolitan Area Networks (MAN), or any combination of the above. In the preferred embodiment, the Repository System utilizes the TCP/IP protocol suite for networking support and services. The preferred embodiment also utilizes Internet Web Technology for communication between Repository Servers, Repository Clients, and Repository Stations.

The Repository Servers 7, 10, and 12 comprise the following components in the preferred embodiment:

Web Server Package (protocols HTTP/TCP/IP, FTP/TCP/IP, etc.)

Windows NT Version 3.51 or greater

Security Package

Repository Entry and Introduction Web Pages

Repository CGI/server API Programs for Repository Access and/or Administration

Repository Search Engine

FTP Server Analysis Tools to Annotate Checked-in Repository Units

Hard Drives for Storage of Repository Units and Repository Meta-data

Networked Access Software

Database Program Utilization (SQL)

Compiler/Linker/Loader Tools for building check-in source code Repository Units

Other alternative embodiments also clearly exist. For example, the present invention may also be implemented on UNIX-based DEC, HP platforms or others that may occur.

The networked access software allows the user to access and search a multitude of off-site or local on-site Repository Servers simultaneously. However, it is possible for a user with the appropriate permission to search multiple Repositories or to be restricted to only certain Repositories. Access is restricted generally without the proper login name and password identifier. The Repository Search Engine also aids the software engineer in finding Components, Frameworks, and other objects on the distributed Repository Servers.

The Repository Servers 7, 10, and 12 are completely contained within a company's local internetwork or distributed across a global Internet. Users with appropriate access permission have the ability to access all known Repositories within the system from a single entry point and are searchable by a single user with one search command. The Repository Server is capable of supporting numerous user names and numerous distributed Repositories simultaneously.

In alternate embodiments, all Repository Servers in the network system have rules that allow them to access and search any other Repository database or deny access to the search as required. The Repository databases may also be encrypted so that the Repository Clients are denied access to the Repository databases via encryption or password identifiers.

Shadow Server 13 contains an index of Shadow Repository 13a of the contents of Repository Server 12 and is intended to provide searching capabilities only. Shadow Server 13 performs the search of the Shadow Repository 13a that Repository Server 12 would perform if it was not "bottle-necked." Logic in the Repository Server 12 redirects the request for the HTML document that contains the searching program to the Shadow Server 13. The Shadow Server 13 then executes the appropriate search utilizing index files associated with the Repository Units. Repository Server 12 keeps its Shadow Server 13 and Shadow Repository 13a current by downloading its index files upon any change, or on a specific schedule. In alternate embodiments a Shadow Server and Shadow Repository exists on any Repository Server or Repository, respectively, in the Repository System.

Figure 3:
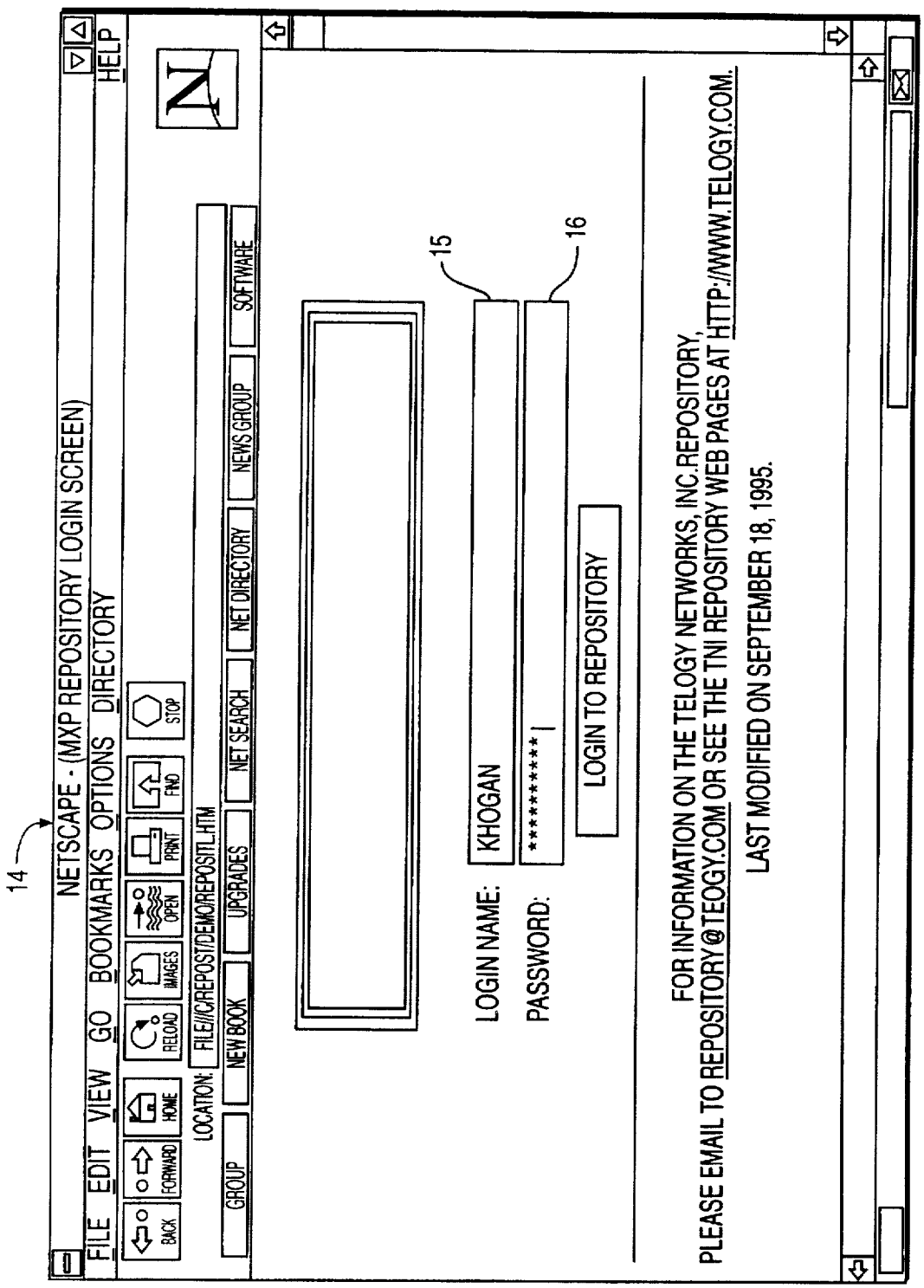
FIG. 3 Repository System Login Screen.

Referring to FIG. 3 the user typically accesses the Repository Server through a Repository interface preferably known as a login page 14. The login page 14 is preferably established on a user interface Repository System based on web pages and a windows or compatible program. It is also envisioned that login may occur without the aid of web technology. In the preferred embodiment the web pages are utilized by the Repository Server 7. The web pages are dynamically created and are completely interactive with multimedia capabilities. The user's desktop utilizes a Windows or compatible program for viewing any downloaded information received from the Repository Server 7. The user uses the Windows program for such purposes as Repository Unit Packaging, Application Playing, and Repository Unit Un-packaging.

The Repository login page 14 comprises a login name 15 and a session password identifier 16. The session password identifier 16 is used to track the user through the Repository screens and displays. If the user attempts to access a prohibited Repository screen, the session is automatically terminated. The termination procedure protects the user from intercepting the session password identifier, thus prohibiting the user from navigating to other prohibited screens. A timeout session for user inactivity or access to a wrong screen is also envisioned as part of the present invention.

The login name 15 and a session password identifier 16 are the first line of security defenses. For added security, access to individual Repository Units such as, Components, Frameworks, or other objects are controlled through an object access list which creates a "security code". This access list is inspected when the user attempts to access the Repository Unit Components, including Frameworks, or other objects. The security code is carried throughout the session through hidden variables in a dynamically created HTML which is generated from the CGI-WIN programs. It is preferred that all programs for creating dynamic Repository web pages are stored in the CGI-WIN directory. In other embodiments, the Web Server may use other CGI mechanisms such as, CGI-DOS, or mechanisms such as JAVA or JAVA script.

The Repository System supports access levels of Browse Access, Check-out Access, and Administrative Access. Unauthorized access attempts are logged into a special audit file for later resolution by a user or a security administrator with the appropriate privileges.

To further add to the security of the system, Repository Units are not accessible through a direct URL, or other web page pointers and may be encrypted. The encrypted Repository Units are only accessible through the windows CGI-WIN program, thus, permitting only logged-in users who have navigated to the appropriate check-out screen to have access thereto. In an alternate embodiment, a secure socket layer is provided for additional measures of security between the Repository Client and the Repository Server. In this mode, a private key is issued to the Repository Client and the Repository Server, wherein the key is utilized for all transmissions over the TCP socket layer.

Once logged-in the user searches the Repository databases by use of search and display templates. The search and display engines of the Repository System utilize these templates to semi-automate searches and display results in a user controlled environment by employing System Attributes. The templates allow the user to construct sets of rules that permit the search to be targeted to reach specific Repository Units. The user has access to all Attributes that are within the users security limits.

Figure 4:
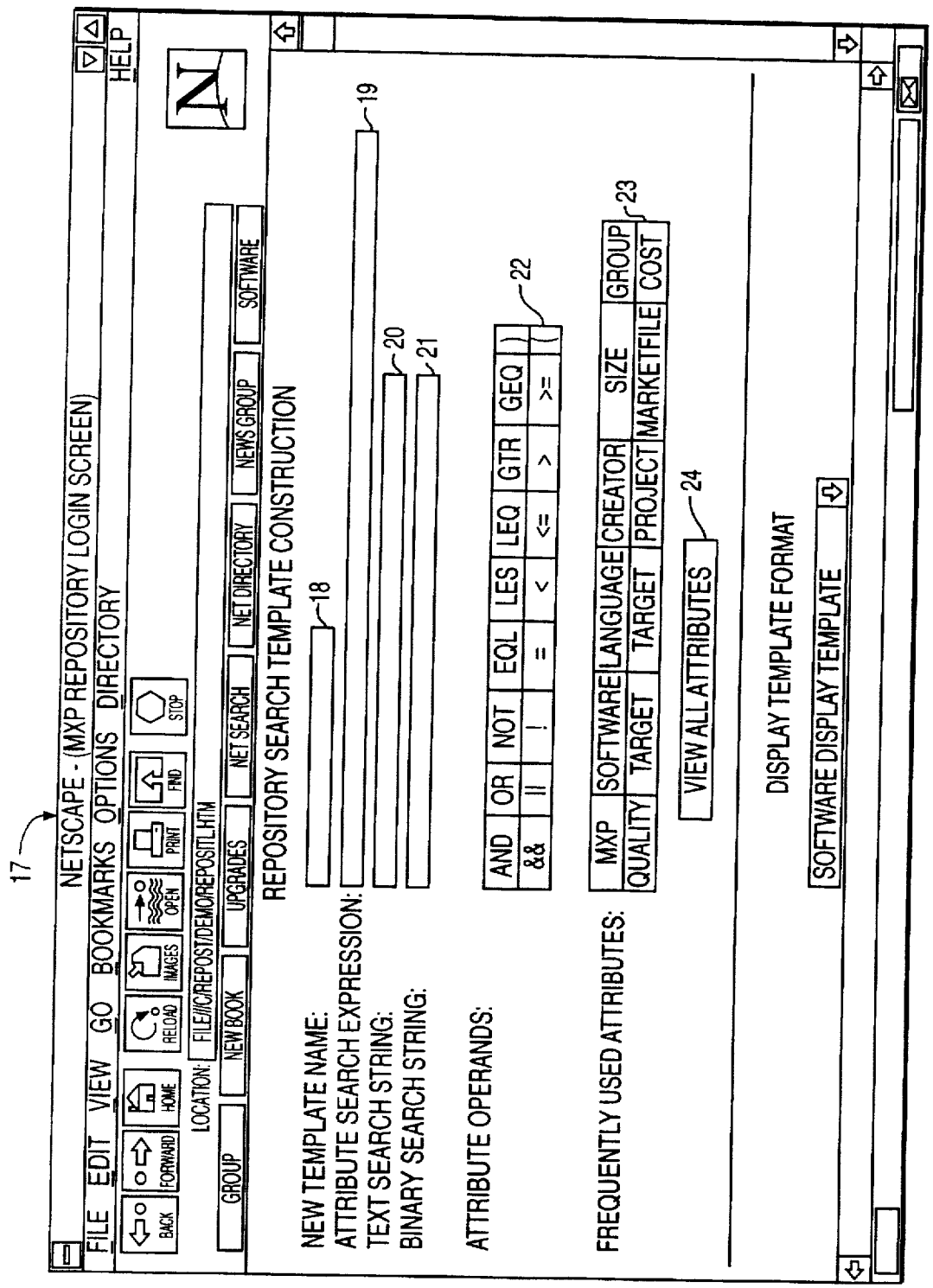
FIG. 4 Repository System Search Template.

Referring to FIG. 4 a Repository Search Template 17 is shown which is based on user assigned and system defined Attributes assigned to the Repository Unit at check-in. The Search Template 17 provides the user with a quick and organized method for performing Repository searches based on the stored attributes. The Attributes allow for flexible characterization of the Repository Units—e.g., the ability to fully characterize a Repository Unit from a technical, quality, business, and documentation stand point. Initially, the Searching Template prompts the user for a new template name 18. Attribute Search Expression 19. Text Search String 20. and a Binary Search String 21. The user does not have to include all information requested by the Repository Search Template 17; however, it is preferred that the user include the new user template name 18 and at least one of the other requested category information—i.e., Attribute Search Expression 19. Text Search String 20. or a Binary Search String 21. The new user template name 18 identifies the search template 17 in the user's individual Search Template Repository. The Search Templates 17 and 25 (as referred to in FIG. 5) are able to be utilized during subsequent Repository searches.

Figure 5:
FIG. 5 Repository System Search Template with a Partial Complete Attribute List.

The Repository Search Template 17 also includes a list of Attributes displayed in the Frequently Used Attribute Interactive Display 23, and a list of Attribute Operands 22. FIG. 5 shows a complete Attribute List 26 as partially shown. The complete Attribute list contains a list of all known user accessible Attributes 23 in the system. These Attributes 23 are user assigned or Repository generated and are stored in a Repository Unit Descriptor File.

An illustrative example of a Search Template for a software engineer user may be as follows:

TemplateName=WellUsedUtilities
Attribute Expression: (Type=Software) && (SubType=Utility) && (Language=C) && (Re-useCount>10)&& (CodeCommentRatio<=2)
or
TemplateName=UsedUtilities
Attribute Expression: (Type=Software) && (SubType=Utility) (CreationDate>6/5/95)

Figure 2A:
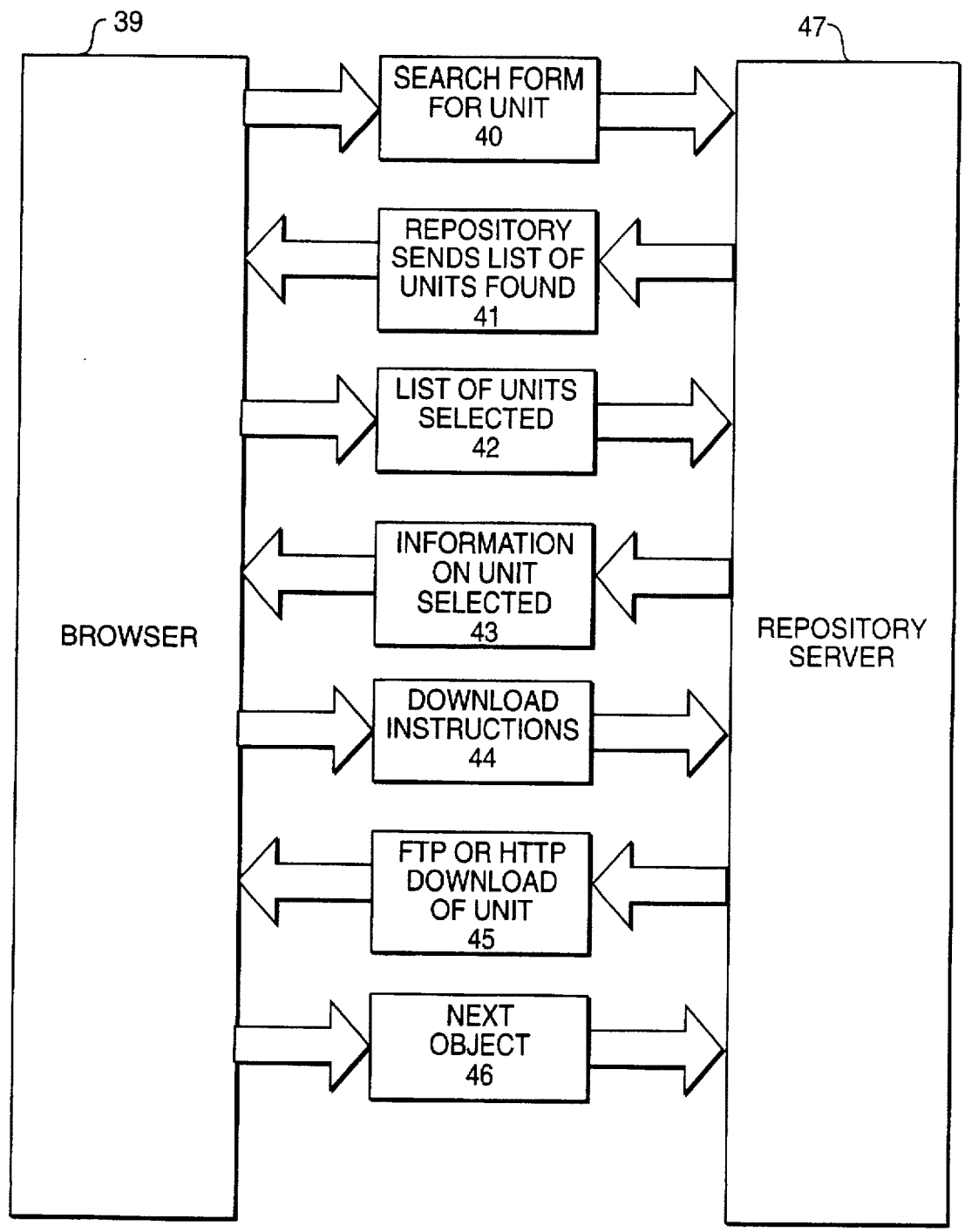
FIG. 2a Real-Time Embedded Software Repository System Interaction Flow.

Referring to FIG. 2a the user accesses the Repository Server 47 via a web browser 39 that is known in the industry. The web browser accesses the Repository Server which, in turn, searches for the requested Repository Units or Components 40. The Repository Server searches the unrestricted Repositories and routes a list of Repository Units 14 to the user's desktop (via the browser). The user then selects certain Repository Units from the Component List 42 and forwards the same to the Repository Server. The Repository Server then searches the appropriate Repositories for the Repository Units 42 and thereafter displays the information on the requested Repository Units on the user's desktop. The Repository Units are then scrutinized by the user and thereafter identified for downloading via download instructions 45 to the Repository Server 47. Once the download instructions are processed by the Repository Server 47 a FTP or HTTP download of the Repository Unit 45 is generated.

At this point the user loads the Repository Unit directly into a new application, re-uses the Repository Unit by combining it with other Repository Components, or makes any revisions thereto. If the Repository Unit is not executable on the user's desktop, simulation techniques as described above, are utilized. Of course this process is directed towards a specific project goal by any Repository Client or Repository Server as fully described above.

For example, using the alternate example above the user may search for Repository Units that have characteristics associated with "(Type=Software)", "(SubType=Utility)", and "(CreationDate>6/5/95)." To search the Repository Server for the requested Repository Units, the user enters Attributes "Software", "Utility", and "created subsequent to 6/5/95" into the Attribute Search Expression Dialog Box 19 or, in the alternative, "clicking" on the appropriate Attribute 23 in the Frequently Used Attributes Interactive Display 24 in the Search Templates 17, 25 or 27 and entering a new user template name 18 as described above. The user can specify in greater detail which Repository Units are required by defining a Text String 20 or adding further Operands 22 to the Attribute Search Expression 19. The addition of search Operands 22 expands or narrows the user's search depending on the user's search intentions.

Figure 6:
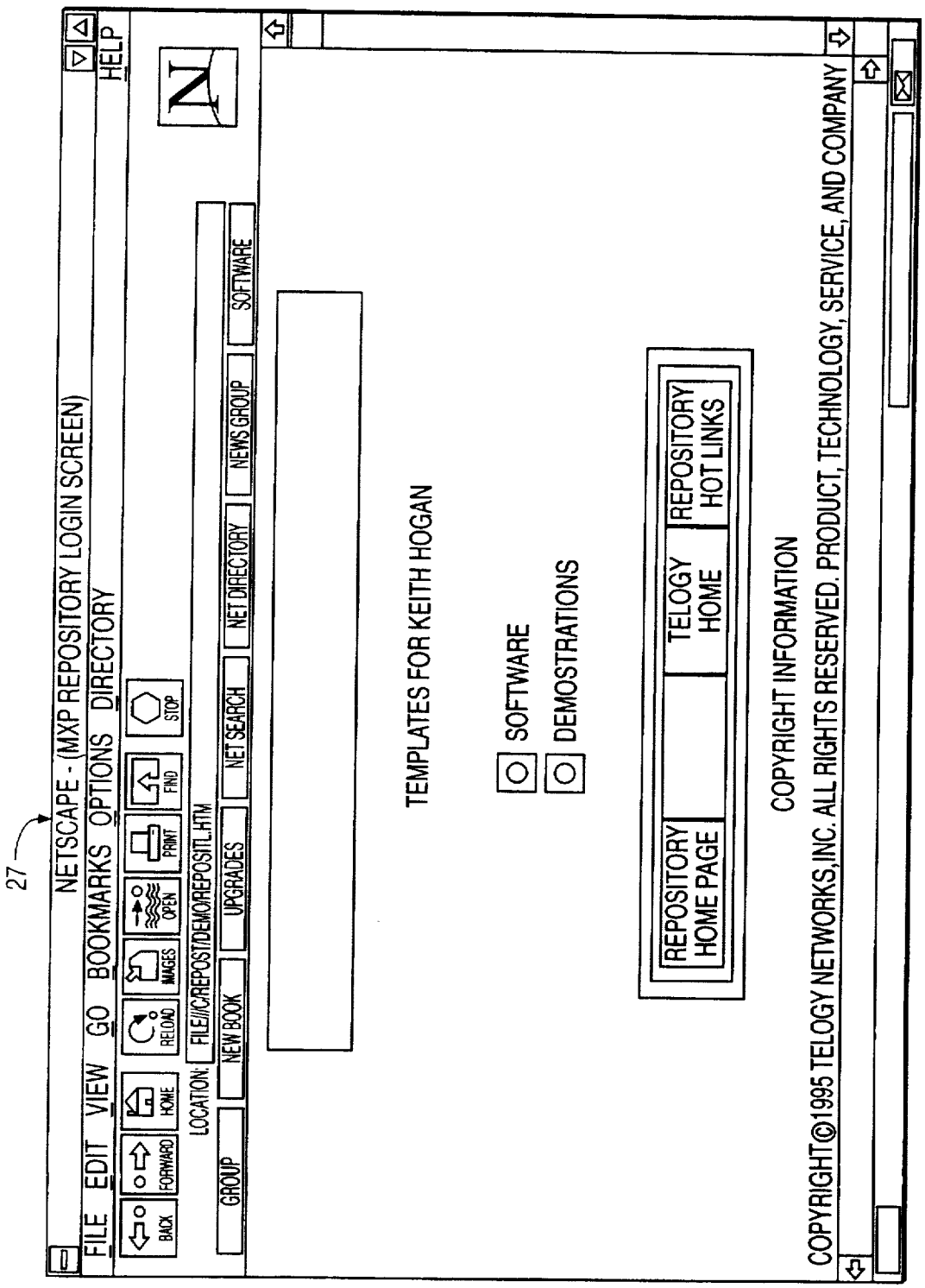
FIG. 6 Repository System Search Template.

Referring to FIG. 6, template 27 allows searching by pre-defined templates which are assigned to specific users. The interface of the templates hides the complexity of the Attribute 19 expression that defines the search criterion. Other examples of searching templates include Text Pattern Search Templates in which text based Repository Units are searchable using key words and phrases. There are no practical limits to the number of templates that the user may define.

Figure 7:
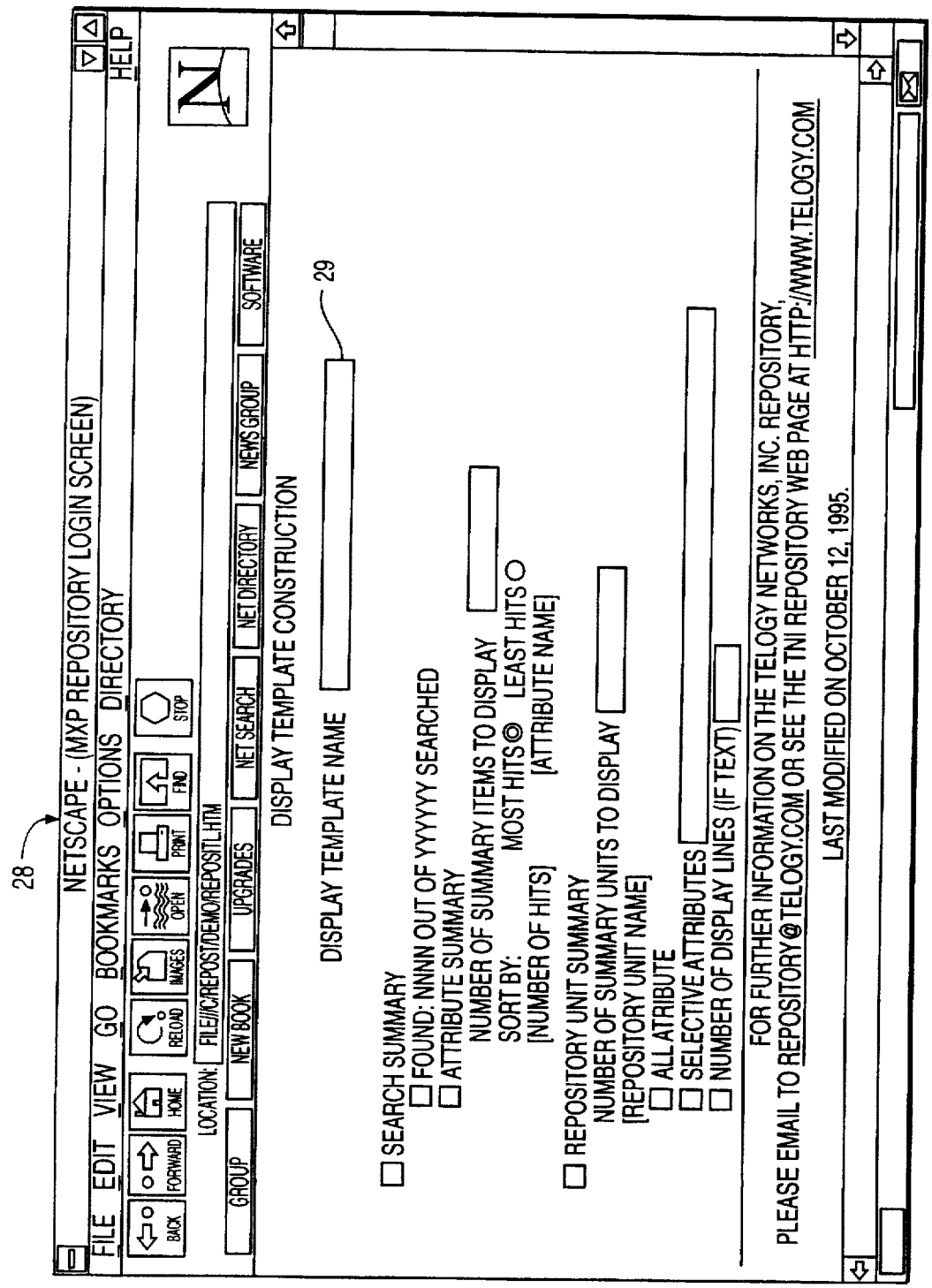
FIG. 7 Repository System Display Template.

Referring to FIG. 7 a Display Template Construction Form 28 is shown. The Display Template Construction Form 28 guides the user in the construction of a custom display template which allows the user to examine search results in a user friendly environment. Alternate display template constructions are envisioned thereby allowing the individual user to construct any number of templates that are user friendly to that user.

Custom Display Templates formed from the Display Template Construction Form 28 allow the user to display only requested information on the Display Template. i.e., Display Form. The Display Templates further allows the user to inspect the Repository Units, and thereafter, download the Repository Units. In the preferred embodiment, the Display Templates are HTML formatted text files that comprise Attribute 23 and attribute value place holder units that are visual notations of potential attributes. Thus, when the Repository Server displays a Repository Unit using the Custom Display Template, the Repository Server generates a dynamic HTML File via the CGI Program, which is thereafter displayed on the Repository Client browser window.

Figure 8:
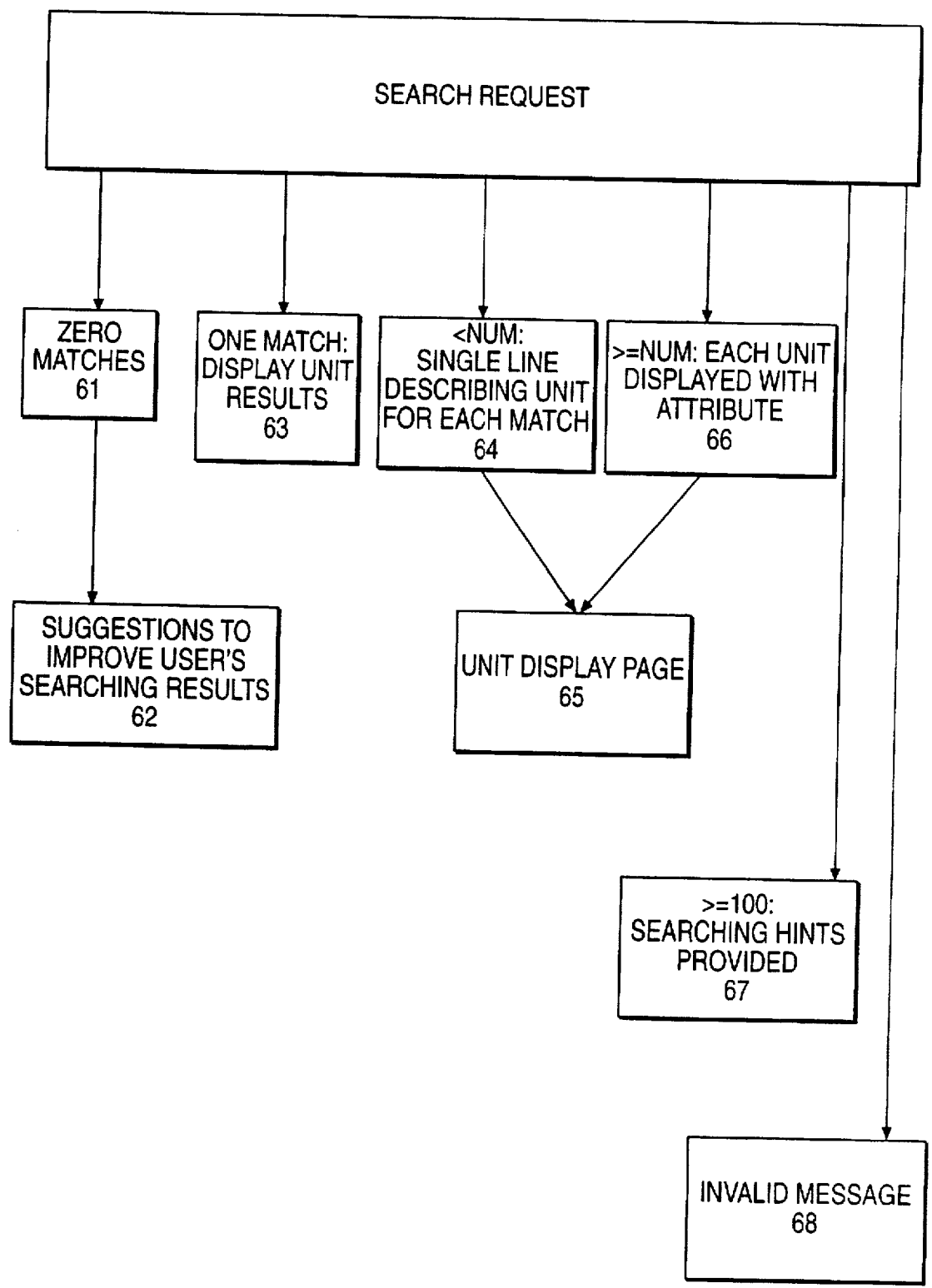
FIG. 8 Search Request Interaction.

Referring to FIG. 8, a Search Result Page 60 displays search results in a dynamic page format. As such, if there are zero matches 61 the Result Page 60 indicates that no matches were found, and thereafter provides suggestions 62 to improve the user's search results. If one match is found the dynamic page is skipped and immediately proceeds to the component display results 63. If "<NUM" (less than a user or System defined number) results are found then a single line displaying the component name and a short description 64 thereof is provided for each match. These single lines are implemented in embedded forms so that when a line is "clicked", a requested Repository Unit is displayed in a "Unit Display Page" 65. If ">=NUM" 66 (greater than or equal to a user or System defined number) results are found then a line displaying each Repository Unit with its Attributes are displayed. This display allows the list of Repository Units to be re-sorted by Attribute 23 each time an Attribute is "clicked." These lines are implemented in embedded forms so that when a line is "clicked", a requested Repository Unit is displayed in the "Unit Display Page" 65. Searching hints 67 are provided when there are greater than a predefined number of Repository Units listed. When the user performs a search using Attributes 23 that are invalid or have permission restrictions, an error message 68 is displayed on the "Unit Display Page" 65 and the requested search is not initiated.

Once the Repository Unit is checked-out, the repository tools create a purchase record for the appropriate billing account, and updates the re-use count in the Repository database as well as the appropriate information concerning the re-user. The Repository Server also includes other administrative access and functions, including amongst others, adding and deleting users, updating system files such as password and access lists, completing the check-in process for new Repository Units, as well as checking security logs and resolving security issues. Users with administrative access via appropriate permission can elect to produce reports or search a company for employees with specific skills. Further, corporate accounting departments can utilize the Repository for generating billing information and determining the asset value of the Repository itself.

The above is only a representative example of administrative functions utilizing the Repository, and as such, other embodiments and administrative functions are envisioned hereto. As an example of alternate embodiments the present invention can be used as an effective staff management tool, such as determining engineering capabilities—i.e., object creation and deposit within the MXP Repository—or for system diagnostic capabilities.

Repository Station

Referring again to FIG. 2, the Repository Station 11 provides Repository Client capabilities and an additional set of tools that allows the user to manage a local Repository, such as the local disk Repositories 3, or a technology-specific Repository CD 4. The Repository Station 11 provides much of the same storage, searching, and cataloging functionalities that the full Repository System supports, preferably with the limitation of functions to the single independent Repositories 3 and 4 or other similar Repository storage areas. The Repository Station 11 Repositories are independently searchable—i.e., the Repository Server 10 does not have access to the Repository station's data or meta-data—utilizing Search Templates 17, 25 or 27 and Display Templates 28.

It is preferred that the Repository Station 11 or similar station, include the following elements:

Web Browser Software
Major Portions of the Web Server Software for Searching Local Repositories
Tutorial Information Web Pages
Simulated or actual Operating Environment for PC
Simulated or actual Development Environment for Windows
Simulated or actual Application Environment
Application Player—Helper Application
Repository Unit Packager Used in Check-in—Helper Application
Repository Un-packager Used in Check-out—Helper Application
Repository-CD Access Software
Compiler/Linker/Loader Tools for building checked-in and checked-out source code Repository Units Helper Applications are discussed in greater detail concurrently with the Repository Client analysis and discussion.

Repository Client

Figure 9:
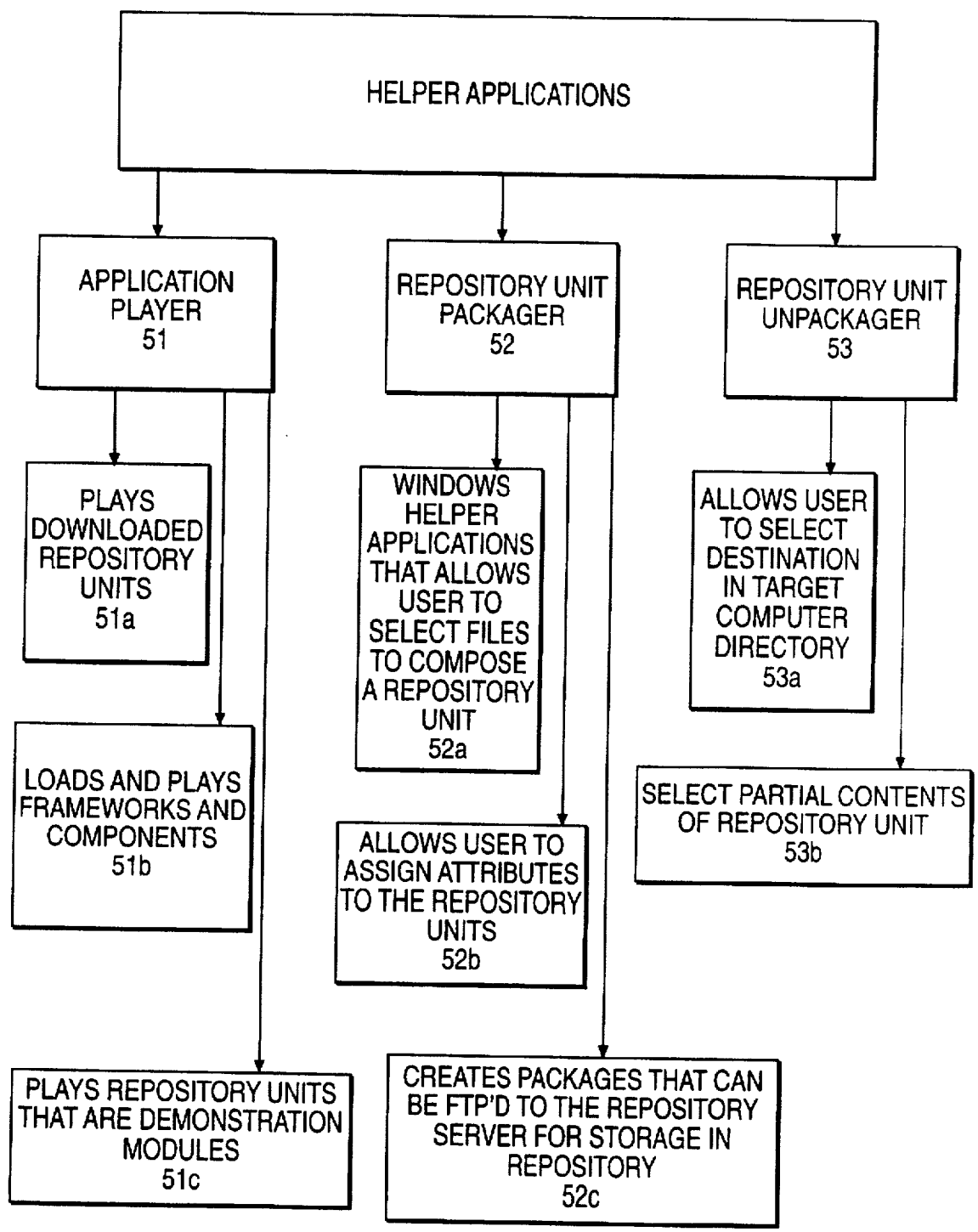
FIG. 9 Helper Application.

Users access the Repository Servers using Repository Client software. The Repository Client comprises a Repository Server access software set that provides the user with a full set of capabilities to interact with the Repository Server. In the preferred embodiment, Repository Client software includes:

Web Browser Software
Other means to simultaneously access multi media cross platform information
Local Tutorial Information Web Pages
Simulated or actual Operating Environment For PC
Simulated or actual Development Environment for Windows
Simulated or actual Applications Environment
MXP Application Player—Helper Application
MXP Application Packager Used in Check in—Web based Helper Application
MXP Repository Unit Un-packager Used in Check-out—Web based Helper Application
Compiler/Linker/Loader Tools for building checked-out source code Repository Units The Repository Client and Repository Station contain Helper Applications that provide enhanced capabilities for the Repository Client and Repository Station. Referring to FIG. 9 the preferred embodiment separates these applications into three distinct categories: Application Player 51, Repository Unit Packager 52, and Repository Unit Un-packager 53. Alternate embodiments, including other Helper Application categories, are also envisioned. The Application Player 51 preferably provides the following capabilities:

Plays Component Repository Units that are downloaded from the Repository 51a (these are MXP compliant software units)
Loads Frameworks that are downloaded from the Repository and allows Components to be loaded into the Framework, and plays the combined Application 51b
Plays Repository Units that are Demonstration Modules 51c The Repository Unit Packager 52 preferably provides the following capabilities:

Windows Helper Application that allows the user to select the files to be combined into a Repository Unit 52a
Allows the user to assign Attributes to the Repository Units 52b
Creates a package that can be transferred via FTP or HTTP to the Repository Server for incorporation into the Repository 52c Lastly, the Repository Unit Un-packager 53a preferably provides the following capabilities:

Selects the destination of the Repository Unit on the desktop directory structure 53a
Selects partial contents of the Repository Unit for storage on the Target Computer 53b.

The Repository Client or Repository Station does not require any special hardware; however, it is preferred that the Repository Client and Repository Station have multimedia capabilities and web browser software packages that are configured with the appropriate Helper Application.

Repository Units

The Repository System is designed to facilitate the re-use and visibility of RTES. This capability is provided by allowing a multitude of different file types to be utilized in describing, demonstrating, or providing support for a single or groups of files containing information about RTES. This allows the user to create a multimedia presentation of the RTES which includes an interactive demonstration.

The Repository System organizes and processes Repository files as Repository Units. In the preferred embodiment the Repository Units are composed of the following files:

Software Source Files such as C, C++, Basic, and Fortran

A group of Software Source Files that make up a utility such as a Balanced Binary Tree Utility, a code download utility, or a checksum utility A group of Software Source Files that make up a sub-system such as a Device Driver, a signaling Software module, a Communication Interface, or a Fax Decode Engine A group of Software Source Files that make up a complete system such as a ATM switch, an Internet Router, or a V.34 Modem Test Software such as packet generation software, load tester software, or device simulation code Project make files which are used to build a software set Sample Data Files such as PCM voice samples, protocol packet samples, or random binary data files Voice Descriptions of projects which an engineer creates to verbally describe various aspects of his/her project Documentation Files from packages such as Framemaker, MS Word, or WordPerfect Picture Files that contain Drawings, Network Displays, Finite State Machines, or Data Description Diagrams A complete Project that contains any combination of the above file types One of ordinary skill in the art of the present invention will appreciate that other files can be composed to form other Repository Units that provide additional information about the RTES stored in the repository. It will also be apparent to one of ordinary skill in the art of the present invention that the above individual file lists also include other equivalent components. For example Documentation Files from packages such as Framemaker, MS Word, or WordPerfect also include, amongst others, QuattroPro, Professional Writer, and OfficeWriter.

Repository Units also contain Attachments that provide current information to static files that are stored in the Repository. The preferred embodiment utilizes the following attachments:

E-mail Threads so that the users can continually assist other users concerning Repository Units Newsgroups (Internet style) such as a Problem Report Group, a Users Group, or a Special Interest Group Expert Quality Ratings so that particular software specialist can inform future re-users of the RTES of the level of quality that can be expected from the Repository Unit Browse Count to record how may times the Repository Unit was browsed a particular Repository user, or a combination of several Repository users Re-use Count to record how many times the Repository Unit was checked out for re-use Purchase Count and Amount to record how many time a Particular Repository Unit was purchased, and the purchase price.

One skilled in the art of the present invention can appreciate that other Attachments are contemplated for use with the present invention.

The Repository Units are further characterized using analysis tools (software analysis). The analysis tools are started when the RTES is initially checked-in to the Repository Server. These tools allow the user to associate fixed and user defined Attributes to the RTES when the user checks software into Repository, as well as creating a set of standard quality index Attributes. The user also has the ability to include a desktop demonstration executable with the re-used software at check-in or later, to be downloaded and run by the potential re-user of the software.

The Repository Units are active entities which allow the addition of more attributes, re-use counts, and test suites. The Repository Units also allow the addition of quality attributes which include the capability of tracking e-mail threads or other problem report threads relating to any particular Repository Unit, or be annotated with business related attributes such as development cost and sales price. The Quality Attributes also track revisions of the Repository Units within the Repository, view the particular Repository Units without having to access or display any prior revisions, as well as support multimedia capabilities and supply security to the Repository Units. Once the software has been accepted for re-use it is downloaded to the desktop and a record of such download is then generated.

To achieve the maximum benefit of the Repository, a categorization feature is provided by the Repository System. The full value includes, amongst other variables, the ability to fully characterize a component from a technical, quality, business, and documentation perspective. The Repository Units further have the capabilities of containing whole projects, Components, and Frameworks.

As mentioned previously, the Repository Search Template 17 includes a list of Attributes 23 and Attribute Operands 22. These Attributes 23 are user assigned or Repository generated and are stored in a Component Descriptor File. The Search Template 17 is implemented as a BOOLEAN expression of Attributes 23 which is evaluated against each Repository's stored components to determine when a desired Repository Unit is identified. It is preferred that the Attributes 23 be constructed into BOOLEAN expressions using the existence of the Attribute 23 in association with the Repository Units, or in the alternative, as a comparison of the Value associated with a given Attribute 23 assigned to a Repository Unit. In the preferred embodiment, the BOOLEAN expressions, i.e., the list of Attribute Operands 22 include, but are not limited, to the following expressions:

| AND | OR | NOT | EQL | LES | LEQ | GTR | GEQ |

Where "AND" is a logical "AND" operation; "OR" is a logical "OR" operation; "NOT" is a logical "NOT" operation; "EQL" is an arithmetic equals operation to compare two like data types, i.e., string to string, integer to integer, dollar value to dollar value (the result of this operation is a BOOLEAN TRUE or FALSE); "LES" is an arithmetic less than operation to compare like data types (the result of this operation is a BOOLEAN TRUE or FALSE); "LEQ" is an arithmetic less than or equal operation to compare two data types (the result of this operation is a BOOLEAN TRUE or FALSE); "GTR" is an arithmetic greater than operation to compare two data types (the result of this operation is a BOOLEAN TRUE or FALSE); "GEQ" is an arithmetic greater than or equal operation to compare two data types (the result of this operation is a BOOLEAN TRUE or FALSE); and "SUBSTR" is a left operand test string that is a sub-string of the right operand substring. Arithmetic equivalents of the above may also be utilized—e.g., "<" is equivalent to "LES." Additionally, any combination of the above Operands 22 can be utilized to facilitate other user defined Repository searches. It is preferred, however, that boolean expressions that contain comparisons of the Value of an Attribute 23 conform to the Attribute's 23 format as well.

Additional analysis information contained in the Components and Frameworks include Operating System Call Return Checking, Operating System Call Utilization, System Resource Utilization, and Memory Space Calculation. Embedded source code analysis information includes object description, comment to code ratio, like-word file, key-word file, complexity analysis, LINT results, and software line count.

How to Use

Figure 10:
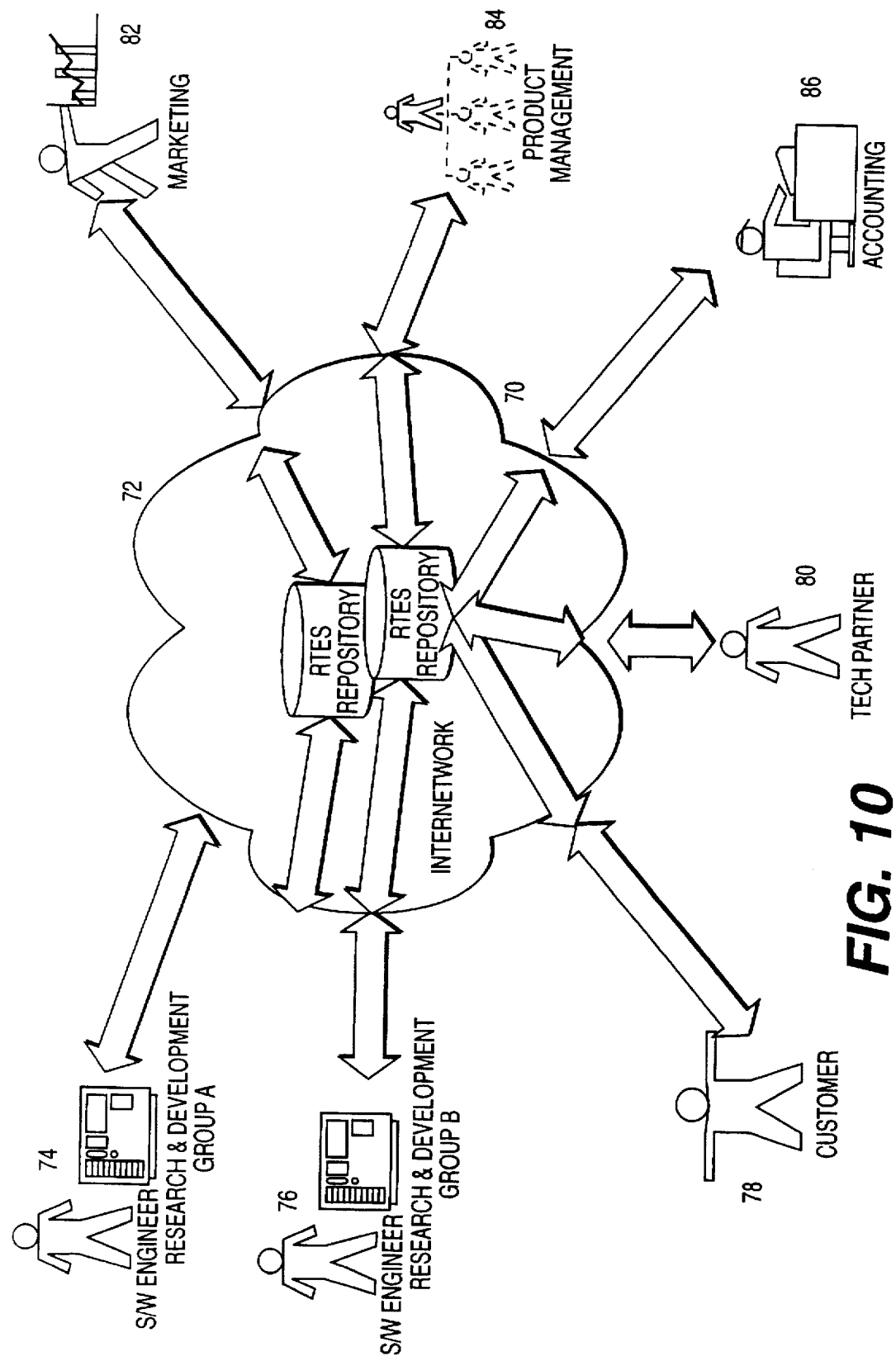
FIG. 10 System Use Overview
FIG. 11 Binary Tree Utility

Referring to FIG. 10, a RTES Repository (Repositories) 70, 72 internetworked to product development groups 74, 76, customers 78, technology partners 80 and corporate divisions, such as marketing 82, product management 84, and accounting departments 86, is shown. As previously stated the Repository comprises in-house server or local disk Repositories 3, Repository technology-specific CD Repositories 4, third party Repositories 5 accessed via the Internet or other internetworked systems, other internal off-site corporate Repositories 6 accessed via the Internet or other internetworked system, or Stand-alone Repository Systems.

In the preferred embodiment, the product development groups 74, 76 access the RTES Repository 70, 72 via the Repository Server (not shown), which, after several steps as enumerated above, are able to download or check-out, i.e., unpackage, the requested Repository Units—via FTP or HTTP mechanisms—to the development group 74, 76 user's desktop. In particular, the product development groups 74, 76 are provided with visibility into RTES stored in the Repository database, and more particularly, reused RTES Components and Frameworks, attribute search results, multimedia presentations, schedules, product, demonstrations, Repository Unit E-mail threads, and Repository Unit problem threads. The product development groups 74, 76 are further able to deposit, i.e., check-in, units to the RTES Repository 70, 72, such as new RTES Components and Frameworks, attribute definitions, multimedia presentations, schedules, product demonstrations, Repository Unit E-mail, threads, and Repository Unit problem threads. This allows for the development and re-use of new products, and new features within existing products.

Technology partners 80 are also provided with visibility into the RTES Components and Frameworks, wherein it is preferred that the technology partners 80 be provided with visibility into Repository Unit E-mail threads, and Repository Unit problem threads, multimedia presentations, schedules, product demonstrations for integration purposes and integration tests. The technology partners 80 are able to check-in attribute definitions, multimedia presentations, schedules, pricing/cost attributes, and Search criterion. This allows the technology partners 80 to perform Integration tests, which, in turn, allows for inter-operating software with other technology partners. Of course the proper protocols for both technology partners 80 and product development groups 74, 76, as enumerated above, must be met when checking-in and checking out RTES, as well as accessing certain Repositories.

It is further preferred that customers 78 have access to the RTES Repository 70,72 as well. Customers 78 are provided with visibility into attribute search results, multimedia presentations, and product demonstrations. Customers 78 are further able to check-in search criterion to the RTES Repository 70,72. This allows Customers 78 to purchase RTES software products. Again to access the Repository, and check-in and check-out Components or Frameworks, the proper protocol as enumerated above must be satisfied. Lastly, Product Marketing Groups 82 and other corporate divisions 84, 86 also have access to the Repository system. In this instance it is preferred that the Product Marketing Groups 82 are provided with visibility into attribute search results, multimedia presentations, schedules, and product demonstrations. In turn, the Product Marketing Groups 82 are able to check-in attribute definitions, multimedia marketing presentations, product demonstrations, and attribute search criterion. Alternate embodiments with regard to checking-in and checking-out of Components and Frameworks, and other information from the RTES Repository are also envisioned with regard to the product development groups 74,76, customers 78, technology partners 80 and corporate divisions 82, 84, 86.

When a user desires to fully evaluate a RTES module stored in the Repository of the present invention, the user is provided with the capability of executing the software retrieved from the repository and observing the characteristics of the RTES module while in operation. The user must also have the ability to vary the configuration parameters or input data so that the RTES module under evaluation can be fully characterized for the proposed application. This is accomplished by an RTES application player. This RTES Repository application player capability allows the user to view the RTES module stored in the Repository and is instrumental in promoting reuse. Since RTES modules can be exercised by a user and then suitability for reuse assessed.

Figure 11:
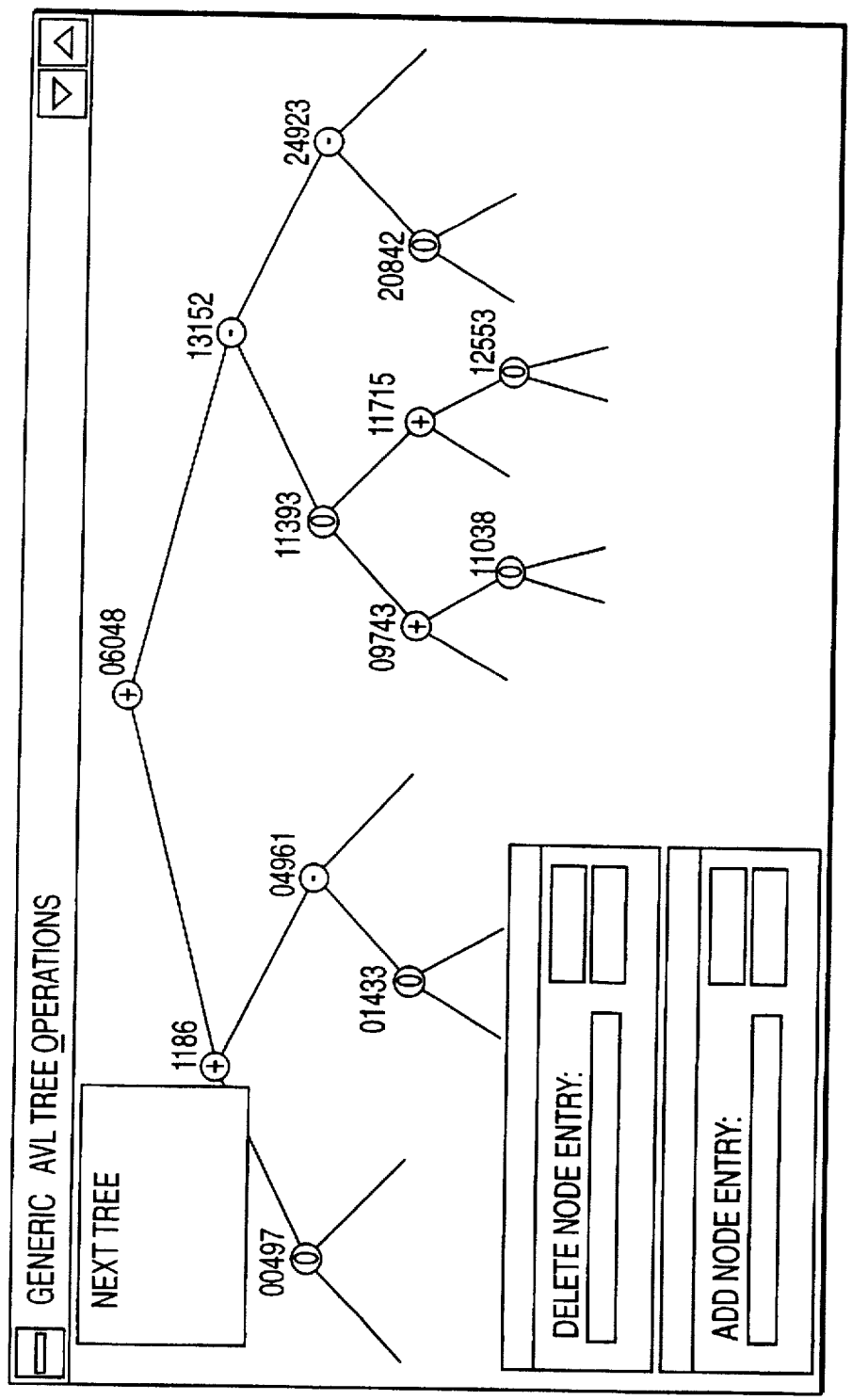

Referring to FIG. 11, an example of such capability is illustrated with the Repository contents for a balanced binary tree utility. This type of software utility typically runs in an embedded environment where it is utilized by various types of software sub-systems such as Protocol Software or embedded database applications. The creator of a software module like the balanced binary tree utility has the capability of including with the Repository Unit one or more Desktop applications, such as a Windows or Unix application, to provide a graphical user interface (GUI). This would involve the creation of a Windows (or Unix) program shell that is built with the utility software to provide the mechanisms for data input and the display of results. The prospective re-user of the utility has the capability of downloading and executing this software on a desktop machine that matches one of the desktop applications associated with the utility that is stored in the Repository (e.g. Windows Desktop machine would download only Windows executables).

It is not always possible for the creator of an embedded software module to create a desktop application with a GUI, though, because the user may not have the specific skills required to write, for example, a Windows application. The user also may not have development time scheduled for that purpose. In order to account for this situation and still provide visibility, the MXP Repository System allows embedded software that is written to an API that conforms to Real-Time Embedded Operating System primitives (such as MXP, PSOS, VxWorks) to be executed in an emulation environment on the Repository Client. The Repository Client (and Repository Station) includes an environment and utility that loads embedded software onto the Desktop and allows it to be executed. This utility is referred to as the RTES Application Player.

The RTES Application Player Desktop utility performs a link operation with an embedded software build downloaded from the RTES Repository. The RTES Application Player includes emulation utilities for the OS primitives associated with real-time embedded operating systems such as timing and synchronization, messaging, task scheduling, and memory management. The utility starts the embedded software as if it is running in the embedded environment, and allows the user to stimulate the embedded software through its OS primitives. For example, when the embedded software includes an input message queue that a task in the embedded software utilizes, the MXP Application Player assists the user in building a message and then allows the user to inject that message on to the specified queue. The embedded software that is executing in the RTES Application Player may then read the message on that queue and perform its operations based on the received message. The RTES application monitors the embedded application from its interface with the OS primitives, and provides the user with a graphical view of OS resource utilization and interaction. The Application Player also includes simulation support for standard interfaces to devices such as communication controllers, dual port RAMS, flash, LCD/LED displays, and other devices common to embedded systems. Applications which utilize these standard interfaces allow enhanced interaction through the Application Player, e.g., viewing simulated displays or connecting multiple applications through communication interfaces.

Other mechanisms may be employed by the RTES Application Player to execute full embedded target specific builds that are stored in RTES Repository on matching target hardware, e.g., a reference hardware design or standard design such as a VME general purpose board. These techniques are well known in the industry, for example, the Application Player can utilize the MXP (VxWorks or other RTOS) to load a target specific module on a Target that is running the RTOS Shell. This technique has a disadvantage, though, of requiring specific target hardware in order to demonstrate the real time embedded software Repository Unit.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the present invention, be apparent to persons of ordinary skill in the art.

What is claimed is:

1. A repository system for storage and retrieval of real-time embedded software comprising:
 a) at least one parent repository server, the parent repository server having storage means;
 b) at least one repository client having multimedia display means;
 c) means for generating a query to the parent repository server, the query generating means resident on the repository client to search for attributes of real-time embedded software stored on the parent repository server;
 d) real-time embedded software stored on the parent repository server storage means;
 e) attributes associated with the real-time embedded software;
 f) search means resident on the parent repository server, the search means having capabilities to respond to the repository client query generating means to search for certain of the real-time embedded software based on the attributes of the real-time embedded software;
 g) the multimedia display means displaying the results of the repository client query made to the parent repository server; and
 h) a first communication link which joins the repository client and the parent repository server.

2. The repository system of claim 1 wherein the parent repository server further comprises means for limiting access to the parent repository server.

3. The repository system of claim 1 wherein the repository system comprises multiple satellite servers at different geographic locations linked via second communication links to the parent repository server.

4. The repository system of claim 3 wherein the parent repository system comprises means for permitting access to these satellite repository servers according to preestablished permissions.

5. The repository system of claim 2 wherein the repository client comprises means for displaying a search template, the search template comprising attributes of the stored real-time embedded software.

6. The repository system of claim 2 wherein the repository client further comprises a local database of real-time embedded software, the real-time embedded software having attributes.

7. The repository system of claim 5 wherein the search template allows searching of the local database of real-time embedded software based on the attributes.

8. The repository system of claim 5 wherein the search template allows searching of the parent repository server storage means for real-time embedded software based on the attributes.

9. The repository system of claim 1 further comprising real time embedded software check-in means.

10. The repository system of claim 9 wherein the check-in means comprises a template in which attributes of the real-time embedded software are entered.

11. The repository system of claim 9 wherein the check-in means further comprises means for dynamically calculating attributes of the real-time embedded software being checked-in.

12. The repository system of claim 2 further comprising encryption means so that real-time embedded software stored on the parent repository server is encrypted.

13. The repository system of claim 2 further comprising a repository server access list, the repository server access list generated based on the query generated by the repository clients.

14. The repository system of claim 1 further comprising a shadow repository capable of responding to the queries of repository clients.

15. The repository system of claim 1 wherein the repository clients have means to limit the access of a user to the repository client.

16. The repository system of claim 15 wherein the access limiting means comprises a login name, a session password, and a session termination procedure.

17. The repository system of claim 5 wherein the search template permits searches selected from the group consisting of binary search string, text search strings, frequency of use key words, key phrases, and user definable attributes.

18. The repository system of claim 5 wherein the search template is user defined.

19. The repository system of claim 5 wherein results of a repository client query generating means are displayed for a user on the multimedia display means.

20. The repository system of claim 19 further comprising download means so that real-time embedded software that meets search criteria entered on the search template is downloaded to the repository client.

21. The repository system of claim 1 further comprising repository tools.

22. The repository system of claim 21 wherein the repository tools comprise message creation tools, adding and deleting user tools, updated password tools, purchase record creation tools, check-in process tools, security log tools, and bill creation tools.

23. The repository system of claim 14 wherein the repository further comprises index creation means and means for downloading the index to the shadow repository.

24. A method for creating a repository of real-time embedded software comprising:

a) storing the real-time embedded software in a first repository server;
   b) characterizing the real-time embedded software by at least one attribute;
   c) creating a query on a repository client to the repository server based on desired the real-time embedded software attributes;
   d) retrieving the real-time embedded software from the first repository server; and
   e) displaying the retrieved real-time embedded software on the repository client.

25. The method of claim 24 wherein the first repository is selected from the group consisting of in-house server repositories, local disk repositories, repository technology-specific CD repositories, third party repositories accessed via the Internet, third party repositories accessed via an internetworked systems, internal off-site corporate repositories accessed via the Internet or other internetworked system, and stand-alone repository systems.

26. The method of claim 24 further comprising limiting access to the repository server.

27. The method of claim 24 further comprising linking at least a second repository server to the first repository server and searching the second repository server based on the query created by the repository client.

28. The method of claim 24 further comprising permitting access to satellite repository servers according to preestablished permissions.

29. The method of claim 24 wherein creating a query further comprises creating a search template on a desktop terminal, the search template comprising potential attributes of the desired real-time embedded software.

30. The method of claim 24 further comprising establishing a local database of real-time embedded software attributes.

31. The method of claim 30 further comprising searching the local database based upon the real-time embedded software attributes.

32. The method of claim 30 wherein searching the local database further comprises completing a template of the real-time embedded software attributes.

33. The method of claim 24 wherein storing the real-time embedded software further comprises checking in the real-time embedded software by completing attributes relating to the real-time embedded software.

34. The method of claim 24 wherein characterizing the real-time embedded software by at least one attribute comprises dynamically calculating attributes of the real-time embedded software being checked-in.

35. The method of claim 24 wherein retrieving the real-time embedded software in the first repository server further comprises encrypting the stored real-time embedded software.

36. The method of claim 24 wherein characterizing the real-time embedded software further comprises creating a repository access list based on the queries generated by the repository clients.

37. The method of claim 24 further comprising creating a repository index and a shadow database capable of responding to queries of repository clients.

38. The method of claim 24 further comprising limiting access to repository clients by access limiting means.

39. The method of claim 38 wherein the access limiting means comprises a login name, a session password, and a session termination procedure.

40. The method of claim 29 wherein the search template permits searches based on the group comprising binary search strings, text search strings, frequency of use of key words, key phrases and user definable attributes.

41. The method of claim 24 wherein creating a query on the repository client involves creating a user defined search template.

42. The method of claim 41 wherein the user defined search template is displayed on a repository client display means.

* * * * *